July 28, 1959  P. F. CHENEA  2,897,024
SEPARATOR FOR ANTIFRICTION BEARING
Filed Feb. 20, 1956
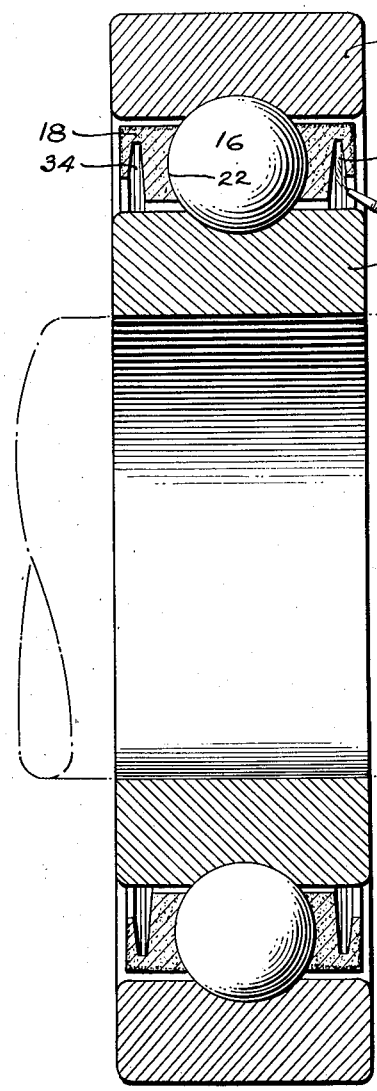
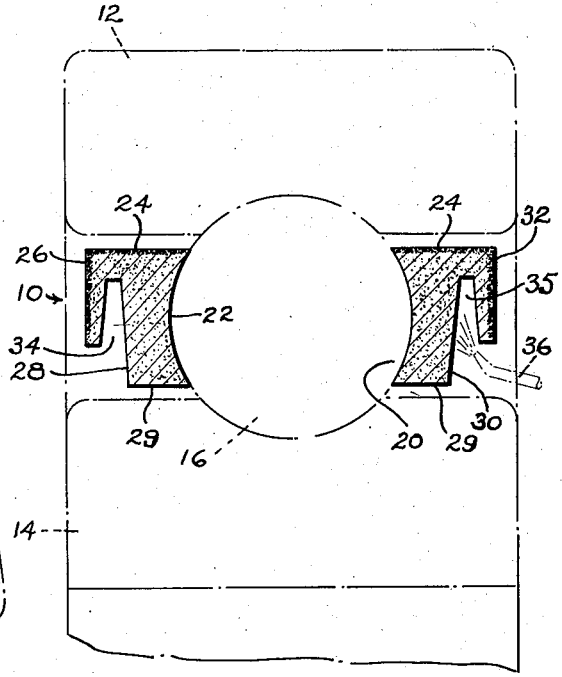
INVENTOR;
PAUL F. CHENEA
BY Edward H. Goodrich
HIS ATTORNEY.

United States Patent Office 2,897,024
Patented July 28, 1959

2,897,024

SEPARATOR FOR ANTIFRICTION BEARING

Paul F. Chenea, Lafayette, Ind., assignor to General Motors Corporation, Detroit, Mich., a corporation of Delaware Application February 20, 1956, Serial No. 566,438

4 Claims. (Cl. 308—201)

The present invention relates to a bearing assembly of the type which includes a porous metal bearing element separator. Specifically, the invention relates to an improved type of separator which is adapted to increase bearing life as well as reduce the quantity of lubricant required.

Porous separators of the type with which the present invention is concerned usually comprise an annular mass of sintered non-compacted powdered metal having a multiplicity of capillary porosities which are adapted to be filled with some lubricating material. Porous metal separators have proved to be very effective in that the lubricant with which they are impregnated is supplied to the bearing surfaces when the bearing is heated and reabsorbed by the separator, rather than running off, when the bearing is inoperative.

The present invention is directed to making such separators even more effective and capable of longer life particularly when the bearing is deprived of externally supplied lubricant. The present separator in conserving lubricant at the same time insures a greater than usual supply of lubricant at the bearing supporting surfaces. The typical porous metal type bearing separator conveys lubricant to the separator surfaces through a plurality of directionally indeterminate capillary passages. Such a separator under the influence of heat and centrifugal forces, therefore, leaks or otherwise supplies lubricant to non-bearing or non-lubricant requiring surfaces in addition to supplying the bearing supporting surfaces. This invention is specifically directed to preventing the indiscriminate flow of lubricant through a porous metal separator and thereby to more effectively confine the lubricant supply to the requisite bearing surfaces.

In achieving this end, a bearing separator has been provided in which certain of the non-bearing surfaces are sealed off so as to prevent the capillary passages terminating therein from passing lubricant to these surfaces. The effect of the present invention is to provide a network of interstitial or capillary passages the net flow from which is directed to bearing supporting or critical surfaces.

It will be apparent that preventing the leakage of lubricant to non-vital or non-bearing surfaces will appreciably increase the life of a bearing particularly after an external source of lubricant is cut off.

A detailed description of the subject invention will be hereinafter set forth.

In the drawings:

Fig. 1 is a bearing assembly embodying one form of improved sintered metal bearing separator.

Fig. 2 is an enlarged view of a portion of the bearing separator.

Referring to the drawing, a bearing assembly is shown generally at 10 and includes an outer bearing race 12, an inner bearing race 14, bearing elements 16, and a bearing separator 18.

The race members 12 and 14 as well as the bearing elements 16 are of conventional construction and constitute no part of the present invention except as combined with the improved separator.

Separator 18 is comprised of sintered non-compacted metal powder of any appropriate material such as bronze, a copper-zinc-graphite mixture or any other material well-known for this purpose in the sintered separator art. The separator is of annular form and includes a plurality of circumferentially spaced bearing retaining apertures or pockets 20. Apertures 20 are defined by spherical bearing surfaces or seats 22. The bearing surfaces 22 are vital or critical surfaces in that they require a constant supply of lubricant upon which the bearing elements 16 may be freely supported. The remaining separator surfaces 24, 26, 28, 29, 30 and 32 are non-bearing or non-critical surfaces and accordingly do not require lubricant. Thus the cross section of separator 18 is generally rectangular and includes the radially spaced outer and inner surfaces 24 and 29 intermediate which are the axially spaced surfaces 26 and 32.

All of the separator surfaces, bearing or non-bearing, initially include a plurality of the terminal ends of the capillary passages and these surfaces are, therefore, potentially able to be lubricated by the interstitially stored lubricant.

In the present invention, certain of these non-critical or non-bearing surfaces are adapted to be sealed off to prevent lubricant from leaking therethrough. In the preferred form of this invention bearing surfaces 24, 26 and 32 are sealed off. It is possible to thus seal or close off the capillary passages leading to these surfaces in many ways. For instance, the surfaces may be mechanically healed over, as by burnishing, or the terminal ends of the passages in these surfaces may be otherwise plugged or sealed by a suitable filler material such as a resin or the like.

While it is not so shown, surface 29 may also be sealed in a similar manner. Generally it has been found to be unnecessary to seal surface 29 since the centrifugal forces acting on the lubricant when the separator is operating tend to throw the lubricant radially outwardly toward the upper separator surface 24 thereby counteracting any tendency of the lubricant to leak through the inner surface 29.

It should also be noted that surfaces 28 and 30 are not sealed. These surfaces remain unsealed in order to provide a surface through which externally supplied lubricant may be fed into the porous separator.

To better supply lubricant to the capillary passages within the bearing separator, the surfaces 28 and 30 are formed in the shape of annular recesses 34 and 35 adjacent to annular end flange portions. As shown, the recesses 34 and 35 are, respectively, enclosed on two sides by the sealed surfaces 24—26 and 24—32 and open on the third side to bearing surface 22. Thus lubricant supplied to either recess 34 or 35, while able generally to flow in all directions through the separator, may have egress therefrom only through the bearing surface 22 when the bearing is in operation. By this ingenious device a multiplicity of heretofore indiscriminately flowing capillary lubricant streams have been given a net direction of movement toward the bearing surfaces where lubricant is required.

A lubricant supplying nozzle 36 is provided to supply lubricant to one of the recesses 34 or 35. It should be noted that if desired lubricant may be supplied to both of the annular lubricant receiving recesses 34 or 35, although under normal conditions supplying one recess is adequate for the needs of the bearing. The provision of two recesses is primarily for the purpose of supplying lubricant to the most convenient side of the separator as well as making the separator reversible.

In a porous metal separator of the general type shown, the bearing elements 16 create a pressure on the bearing surfaces 22 against which the lubricant issuing from the terminal ends of the interstitial passages must work. In previously known separators, this bearing pressure accentuates the lubricant leakage out of the non-bearing surfaces where such pressure is not present. Assuming a given quantity of lubricant, it is apparent that this leakage from the non-bearing surfaces diminishes the lubrication of the bearing surfaces.

Assuming the interruption of externally supplied lubricant from nozzle 36, the rate of lubricant dissipation from the sealed separator, as shown, will be considerably less as contrasted with a similar unsealed separator. Consequently, the life of a bearing utilizing the sealing concept of the subject separator will be greatly enhanced by limiting lubricant egress to bearing surfaces.

I claim:

1. A separator for an antifriction bearing comprising a rotatable annular metal member having an intercommunicating open pore structure, said member having a series of circumferentially spaced pockets for antifrictionally receiving and rotatably guiding bearing elements, said member being provided with a lubricant-receiving recess extending alongside a plurality of the pockets, means to direct lubricant under pressure into the recess, and the metal of said member closing off the ends of the pores at its peripheral surface and at its end surfaces of said member whereby lubricant fed into the recess will be directed through the separator and into said pockets.

2. A separator for an antifriction bearing comprising a rotatable annular metal member having an intercommunicating open pore structure, said member being provided with a series of circumferentially spaced pockets for receiving and antifrictionally guiding circumferentially spaced bearing elements, an annular flange at one end of said member, the separator having an annularly extending lubricant-receiving recess between the flange and the body portion of said member, means to feed lubricant under pressure into the recess, and the pore structure at the periphery of the separator and on the outer surface of said flange being burnished and sealing off the pore openings at these surfaces whereby lubricant fed into the recess will be distributed through the pores of the separator into said pockets.

3. A separator for an antifriction bearing comprising a rotatable annular metal member having an intercommunicating open pore structure, said member being provided with a series of circumferentially spaced pockets for antifrictionally receiving and guiding circumferentially spaced bearing elements, an annular flange at each end of said member, the separator being provided with an annular lubricant receiving recess between each flange and said pockets, means to feed lubricant under pressure into each recess, and the pore structure at the periphery of the separator and at the end faces of each flange being sealed off by mechanically healing over the metal of said member to close the pore openings at each of said surfaces whereby lubricant directed into said recesses will flow endwise through the separator into the bearing element-receiving pockets.

4. A separator for an antifriction bearing comprising a rotatable annular metal member having an intercommunicating open pore structure throughout its body, said member being provided with a series of circumferentially spaced pockets for receiving and antifrictionally guiding spaced bearing elements, an annular flange at each end of said member, said flanges providing a pair of spaced annular recesses in the separator adjacent the pockets, said recess opening radially inwardly of the metal member, the pores opening into said recess and into said pockets, means to direct fluid lubricant under pressure into each recess, and the pores at the axial outer face of each flange and at the periphery of said annular member having their ends sealed off by burnishing the metal of the member whereby lubricant fed into the recesses under pressure will flow generally axially through the pore structure of the separator into said pockets.

References Cited in the file of this patent

UNITED STATES PATENTS

| 2,038,010 | Smith | Apr. 21, 1936 |
| 2,228,406 | Schmidt | Jan. 14, 1941 |
| 2,280,659 | Muller | Apr. 21, 1942 |
| 2,569,531 | Kunzog | Oct. 2, 1951 |

FOREIGN PATENTS

| 592,947 | Great Britain | Oct. 3, 1947 |
| 724,603 | Great Britain | Feb. 23, 1955 |